US012789478B2

(12) United States Patent
Kang et al.

(10) Patent No.: US 12,789,478 B2
(45) Date of Patent: Nov. 10, 2026

(54) AUTOMATION APPARATUS FOR MANUFACTURING AND INSPECTING WDM ELEMENT

(71) Applicant: SMART LIGHT TECHNOLOGY. CO., LTD, Gunpo-si Gyeonggi-do (KR)

(72) Inventors: Jung Gyu Kang, Gunpo-si Gyeonggi-do (KR); Geon Soo Ryoo, Seongnam-si Gyeonggi-do (KR)

(73) Assignee: SMART LIGHT TECHNOLOGY. CO., LTD, Gunpo-si Gyeonggi-do (KR)

( * ) Notice: Subject to any disclaimer, the term of this patent is extended or adjusted under 35 U.S.C. 154(b) by 253 days.

(21) Appl. No.: 18/738,322

(22) Filed: Jun. 10, 2024

(65) Prior Publication Data

US 2025/0332797 A1 Oct. 30, 2025

(30) Foreign Application Priority Data

Apr. 25, 2024 (KR) ........................ 10-2024-0055125
Apr. 25, 2024 (KR) ........................ 10-2024-0055128
Apr. 25, 2024 (KR) ........................ 10-2024-0055129

(51) Int. Cl.
*B29C 65/54* (2006.01)
*B29C 65/00* (2006.01)
(Continued)

(52) U.S. Cl.
CPC ........ *B29C 65/542* (2013.01); *B29C 65/7841* (2013.01); *B29C 66/95* (2013.01); *B29L 2011/00* (2013.01)

(58) Field of Classification Search
CPC .............. B29C 65/542; B29C 65/4845; G02B 6/12007; G02B 6/2937; G02B 6/2938;
(Continued)

(56) References Cited

U.S. PATENT DOCUMENTS

2011/0182586 A1* 7/2011 Ji ......................... G02B 6/2938 398/88
2013/0331689 A1* 12/2013 Le ......................... A61B 5/0066 385/33

FOREIGN PATENT DOCUMENTS

CN 2611921 Y * 4/2004
JP H0843676 A 2/1996
(Continued)

*Primary Examiner* — Carson Gross
(74) *Attorney, Agent, or Firm* — Dinsmore & Shohl LLP; Yongsok Choi, Esq.

(57) ABSTRACT

An automation apparatus for manufacturing and inspecting a WDM element may include a capillary gripper fixing each capillary, a gripper moving stage moving the capillary fixed to the capillary gripper so that the capillary moves into a glass tube or becomes distant therefrom, a dispenser injecting a bonding material into a gap formed by each capillary and the glass tube, a rotation belt partially coming into contact with and rotating the glass tube, a hardening part hardening the bonding material, a photographing part obtaining an image of a portion into which the bonding material has been injected, an inspection part inspecting the amount of injection of the bonding material, the state in which the bonding material has been applied, and whether an air bubble has occurred in the bonding material, based on the obtained image, and a controller controlling an operation of each component within the automation apparatus.

2 Claims, 17 Drawing Sheets

100

(51) Int. Cl.
*B29C 65/78* (2006.01)
*B29L 11/00* (2006.01)

(58) Field of Classification Search
CPC .......... G02B 2006/12164; B32B 37/12; B32B 2037/1253; B32B 38/1833; B32B 2038/1891; B32B 41/00; B32B 2041/04
See application file for complete search history.

(56) References Cited

FOREIGN PATENT DOCUMENTS

| | | | |
|---|---|---|---|
| JP | 2009109243 | A | 5/2009 |
| JP | 2014149168 | A | 8/2014 |
| KR | 1020190114072 | A | 10/2019 |
| KR | 1020220037906 | A | 3/2022 |
| KR | 102396360 | B1 | 5/2022 |
| KR | 102422893 | B1 | 7/2022 |
| KR | 102632047 | B1 | 2/2024 |

* cited by examiner

AUTOMATION APPARATUS FOR MANUFACTURING AND INSPECTING WDM ELEMENT

CROSS-REFERENCE TO RELATED APPLICATIONS

The present application claims priority under 35 U.S.C. § 119 (a) to Korean Patent Application No. 10-2024-0055125, 10-2024-0055128, 10-2024-0055129 filed in the Korean Intellectual Property Office on Apr. 25, 2024, the entire disclosure of which is incorporated herein by reference.

These patents are the results of research that was carried out by the support (a unique project number: 1425176252, a detailed project number: 00218339, a project name: Development of automated packaging technology and equipment for optical MUX modules exported to the U.S. for 6G systems) of Korea Technology and information Promotion Agency for SMEs by the finances of the government of the Republic of Korea (The Ministry of SMEs and Startups).

BACKGROUND

1. Technical Field

The present disclosure relates to an automation apparatus for manufacturing and inspecting a wavelength division multiplexing (WDM) element, which has automated all processes of manufacturing a WDM element and inspecting the manufactured WDM element.

2. Related Art

Contents described in this part merely provide background information of the present embodiment, and do not constitute a conventional technology.

Wavelength division multiplexing (WDM) refers to a technology in which optical signals having several wavelengths are simultaneously transmitted through one strand of optical fiber for each channel. The past time division multiplexing (TDM) equipment is a technology in which one channel is transmitted through one optical fiber, whereas the WDM technology is a technology capable of effectively handling increasing Internet traffic.

An optical fiber that transmits and receives an optical signal, a lens that focuses the optical signal, and a filter that transmits only light having a specific wavelength band are coupled to a WDM reflection port within a WDM optical fiber port. Accordingly, only light that may pass through the filter, among pieces of light that are transmitted through the optical fiber and that have a plurality of wavelength bands, is output to a separate optical fiber. Light having the remaining wavelength bands is reflected by the filter.

A WDM element that is used in the WDM technology is manufactured by aligning and then bonding the optical fiber and the lens disposed in the reflection port, aligning and then bonding the bonded reflection port and a tube in the outskirts thereof, and finally aligning and then bonding a pass port that receives light that passes through the reflection port and the filter within the tube.

Conventionally, in performing the alignment and bonding of the reflection port or the alignment and bonding of the reflection port and the pass port, all processes are performed by a manual work. Furthermore, after the alignment and bonding of any one of the reflection port and the pass port or both the reflection port and the pass port are completed, to inspect whether the alignment and the bonding have been accurately performed is also performed by a manual work. Accordingly, a conventional WDM element has problems in that it has a low yield and a high price.

SUMMARY

An embodiment of the present disclosure is directed to providing an automation apparatus for manufacturing and inspecting a WDM element, which has automated all of processes of manufacturing a WDM element and inspecting the manufactured WDM element.

According to an aspect of the present disclosure, an automation apparatus for manufacturing and inspecting a wavelength division multiplexing (WDM) element may include a capillary gripper configured to fix each capillary to be fixed to a glass tube by a bonding material, a gripper moving stage configured to move the capillary fixed to the capillary gripper so that the capillary moves into the glass tube or the capillary becomes distant from the glass tube, a dispenser configured to inject the bonding material into a gap that is formed by each capillary and the glass tube, a rotation belt configured to come into contact with the glass tube through a part thereof and to rotate the glass tube, a hardening part configured to harden the bonding material, a photographing part configured to obtain an image of a portion into which the bonding material has been injected, an inspection part configured to inspect the amount of injection of the bonding material, the state in which the bonding material has been applied, and whether an air bubble has occurred in the bonding material, based on the image captured by the photographing part, and a controller configured to control an operation of each component within the automation apparatus for manufacturing and inspecting a WDM element.

According to an aspect of the present disclosure, the controller detects a preset angle of a second capillary at which light that has passed through a first capillary is able to be incident with a maximum size.

According to an aspect of the present disclosure, after detecting the preset angle, the controller moves each of the first and second capillaries into the glass tube.

According to an aspect of the present disclosure, the controller controls the dispenser to inject the bonding material into a gap that is formed by each capillary and the glass tube.

According to an aspect of the present disclosure, after the bonding material is applied, the controller controls the capillary gripper so that the second capillary has the preset angle.

According to an aspect of the present disclosure, after the angle is adjusted, the controller controls the hardening part to harden the bonding material.

According to an aspect of the present disclosure, the automation apparatus further includes memory configured to store the preset angle of the second capillary detected by the controller.

As described above, an aspect of the present disclosure has advantages in that it is possible to improve the yield of WDM elements and reduce a manufacturing cost for the WDM elements because all processes of manufacturing the WDM elements and inspecting the manufactured WDM elements are automated.

DETAILED DESCRIPTION

Figure 1:
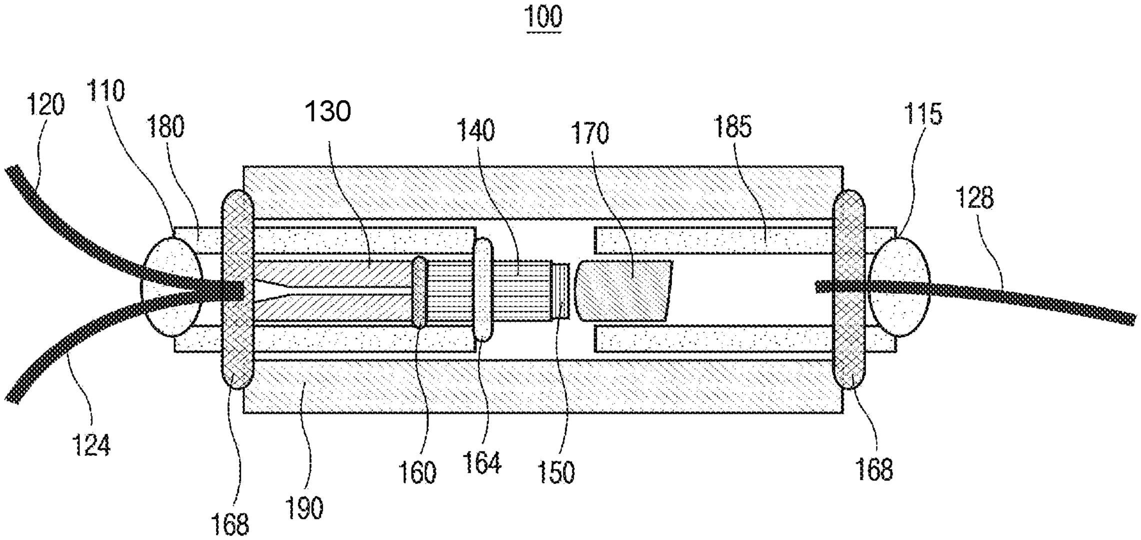
FIG. 1 is a cross-sectional view of a WDM element.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected" or "directly coupled" to the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

FIG. 1 is a cross-sectional view of a wavelength division multiplexing (WDM) element.

Referring to FIG. 1, a WDM element 100 includes a first capillary 110, a second capillary 115, a first optical fiber 120, a second optical fiber 124, a third optical fiber 128, and a glass tube 190.

The first capillary 110 is a structure for disposing and fixing or moving the first optical fiber 120 and the second optical fiber 124, and includes a dual fiber fixing member 130, a first lens 140, a filter 150, and a tube 180. Likewise, the second capillary 115 is a structure for disposing and fixing or moving the third optical fiber 128, and includes a second lens 170 and a tube 185.

An optical signal that is applied to a WDM filter is applied through the first optical fiber 120. Light that is included in the applied optical signal and that has a wavelength band that needs to be separated through the first lens 140 and the filter 150 passes through the filter 150. Light that is included in the applied optical signal and that has the remaining wavelengths is filtered by the filter 150 and reflected by the second optical fiber 124. The light that passes through the filter 150 is focused on the third optical fiber 128 through the second lens 170, and is transmitted along the third optical fiber 128.

The first optical fiber 120 and the second optical fiber 124 are disposed and fixed within the dual fiber fixing member 130.

The first lens 140 couples light output by the dual fiber fixing member 130 to the filter 150, and focuses light that is filtered and reflected by the filter 150 on the second optical fiber 124 within the dual fiber fixing member 130 so that the light is incident on the second optical fiber 124. A GRIN lens may be used as the first lens 140. The GRIN lens plays a role of generating parallel light or generating focused light. The first lens 140 may generate light having a parallel light form when coupling light output by the dual fiber fixing member 130 to the filter 150, and may generate focused light in an opposite direction thereof.

The filter 150 transmits only light having a preset wavelength band, among pieces of light incident thereon, toward the second lens 170, and reflects light having the remaining wavelength bands, among the pieces of light incident thereon, toward the second optical fiber 124. The filter 150 transmits only light having a desired wavelength band, and enables the transmission and reception sides to smoothly communicate with each other. A filter having a thin film chip form may be used as the filter 150.

Each of bonding materials 160, 164, and 168 fixes two components to be fixed by being injected between the two components and then hardened. The bonding material 160 fixes the dual fiber fixing member 130 and the first lens 140 by being injected between the dual fiber fixing member 130 and the first lens 140 and then hardened so that a reflection port (i.e., a combination of the dual fiber fixing member 130 and the first lens 140) is formed. The bonding material 164 is injected between the reflection port and the tube 180 and then hardened so that the tube 180 can be disposed in the outskirts of the reflection port. The bonding material 168 is injected between the reflection port/a pass port (i.e., a combination of the second lens 170 and the third optical fiber 128) and the glass tube 190 and then hardened so that the glass tube 190 can protect each component of the WDM element 100 in the most outskirts thereof. Each of the bonding materials 160, 164, and 168 may be implemented by using any component which may be hardened by light having a preset wavelength, such as epoxy.

The second lens 170 is disposed behind the filter 150 in the direction in which light travels toward the filter 150, and focuses light that has passed the filter 150 on the third optical fiber 128. The second lens 170 focuses the light that has undergone the filter 150 on the third optical fiber 128 so that the light filtered by the filter 150 travels along the third optical fiber 128.

The tubes 180 and 185 are disposed in the outskirts of the reflection port and the pass port, respectively, and make uniform the diameters of the reflection port and the pass port, respectively. The reflection port and the pass port form the WDM element within the glass tube 190. In this case, it is preferred that the WDM element has a generally uniform diameter. However, the thicknesses (or diameters) of the dual fiber fixing member 130 and the first lens 140 that are included in the reflection port and the thickness (or diameter) of the second lens 170 that is included in the pass port may not be uniform. In general, each of the dual fiber fixing member 130 and the first lens 140, and the second lens 170 has a good possibility that the thickness (or diameter) of each of the dual fiber fixing member 130 and the first lens 140, and the thickness (or diameter) of the second lens 170 are not uniform. In order to solve such a problem, the tubes 180 and 185 are disposed in the outskirts of the reflection port and the pass port, respectively, and make uniform the diameters of the reflection port and the pass port, respectively.

The glass tube 190 includes components within the WDM element 100 therein and protects the components against an external force.

Figure 2:
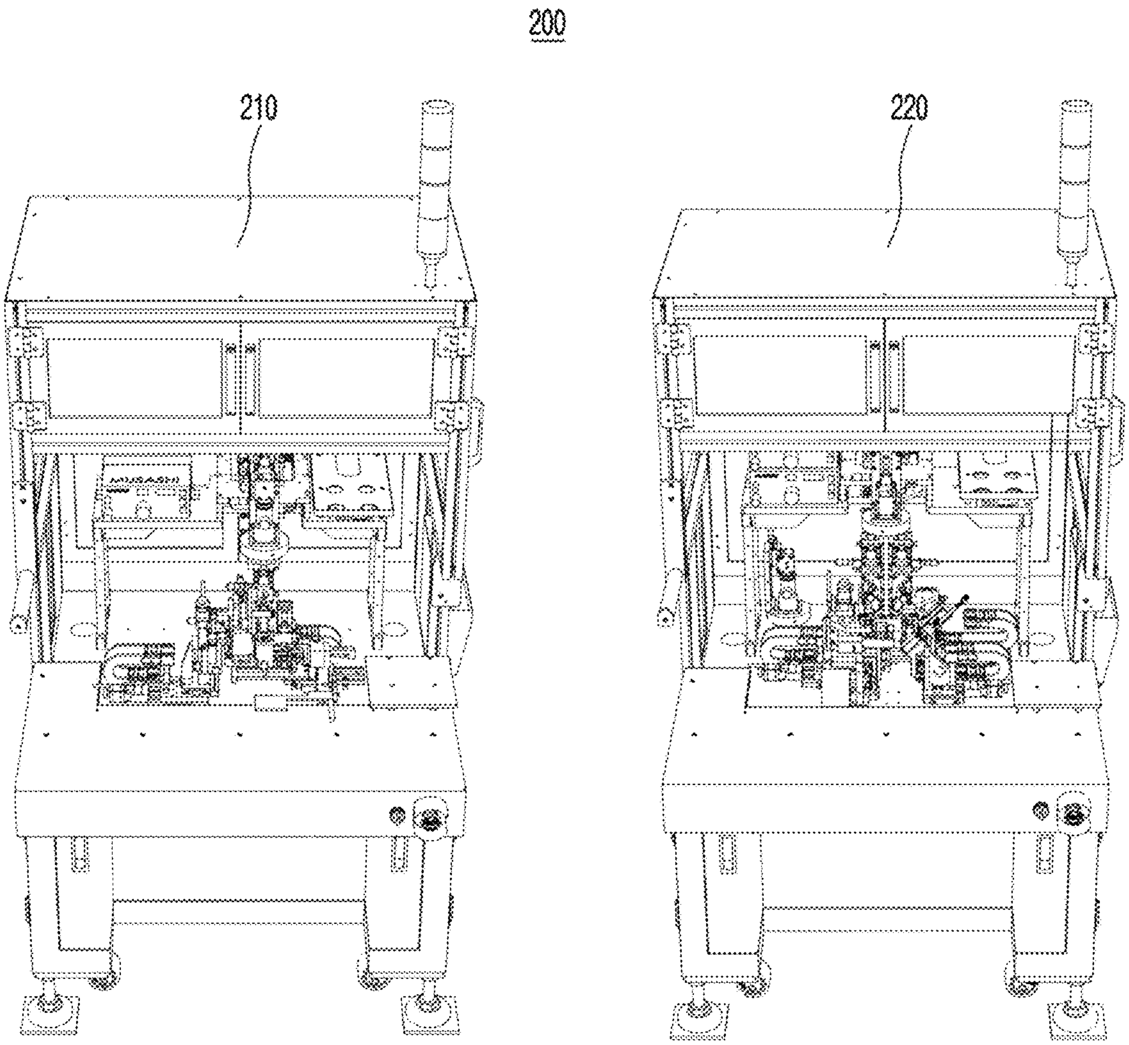
FIG. 2 is a diagram illustrating a construction of an automation system for manufacturing and inspecting a WDM element according to an embodiment of the present disclosure.

FIG. 2 is a diagram illustrating a construction of an automation system for manufacturing and inspecting a WDM element according to an embodiment of the present disclosure.

Referring to FIG. 2, an automation system 200 (hereinafter abbreviated as a "system") for manufacturing and inspecting a WDM element according to an embodiment of the present disclosure includes an automation apparatus 210 (hereinafter abbreviated as a "first apparatus") for manufacturing and inspecting a reflection port and an automation apparatus 220 (hereinafter abbreviated as a "second apparatus") for manufacturing and inspecting a WDM element.

The first apparatus 210 aligns and bonds the dual fiber fixing member 130 and the first lens 140, that is, components included in the reflection port, and inspects whether the dual fiber fixing member 130 and the first lens 140 have been wholly aligned and bonded. The first apparatus 210 wholly performs the alignment, bonding, and inspection if the dual fiber fixing member 130 and the first lens 140 have only to be held in the first apparatus 210, without the need for a worker to align and bond the dual fiber fixing member 130 and the first lens 140 and to inspect the manufactured reflection port one by one as in a conventional technology. A detailed construction and operation of the first apparatus 210 are described later with reference to FIGS. 4 to 15.

The second apparatus 220 inserts the reflection port that has been aligned and bonded by the first apparatus 210 into the glass tube 190 along with the pass port, aligns and bonds the reflection port and the pass port, and inspects whether the reflection port and the pass port have been wholly inserted, aligned, and bonded. Likewise, the second apparatus 220 wholly performs the alignment, bonding, and inspection if the reflection port and the pass port have only to be held in the second apparatus 220 without the need for a worker to perform the alignment, bonding, and inspection one by one by manual work. A detailed construction and operation of the first apparatus 210 are described later with reference to FIGS. 16 to 28.

Figure 3:
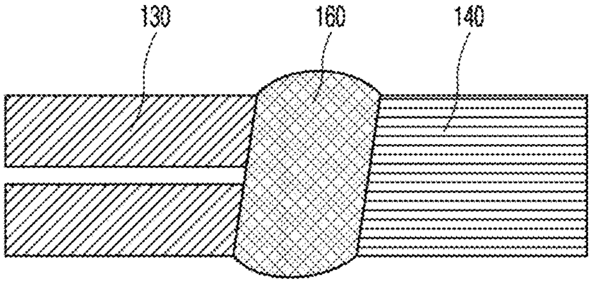
FIG. 3 is a cross-sectional view of a reflection port according to an embodiment of the present disclosure.
Figure 4:
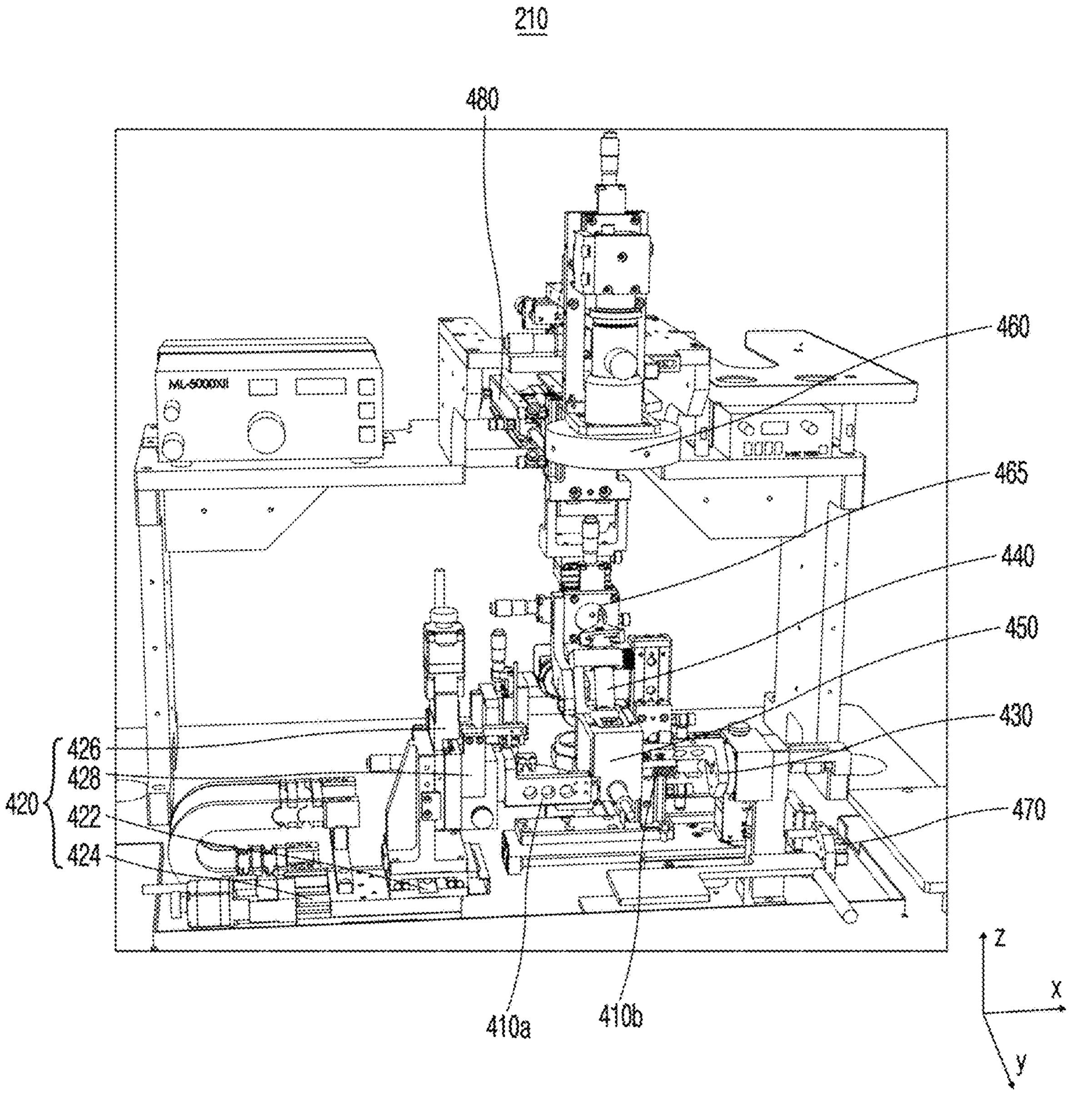
FIG. 4 is a diagram illustrating a construction of an automation apparatus for manufacturing and inspecting a reflection port according to an embodiment of the present disclosure.

FIG. 3 is a cross-sectional view of a reflection port according to an embodiment of the present disclosure. FIG. 4 is a diagram illustrating a construction of an automation apparatus for manufacturing and inspecting a reflection port according to an embodiment of the present disclosure.

Referring to FIG. 3, as described above, the dual fiber fixing member 130 and the first lens 140 are disposed within the reflection port. In this case, surfaces to which the dual fiber fixing member 130 and the first lens 140 are bonded are not formed to be parallel to a vertical direction, but are formed to have a preset angle to the vertical direction, more specifically, an angle of about 8°. As the dual fiber fixing member 130 and the first lens 140 are bonded to have a corresponding angle, unwanted reflection from the bonded surfaces to one optical fiber can be minimized when light travels from the one optical fiber within the dual fiber fixing member 130 to the first lens 140.

The first apparatus 210 bonds the dual fiber fixing member 130 and the first lens 140 to have a preset angle, inspects whether the dual fiber fixing member 130 and the first lens 140 have been bonded as described above, and inspects whether the dual fiber fixing member 130 and the first lens 140 have been properly bonded by the bonding material that has been properly injected between the dual fiber fixing member 130 and the first lens 140. The first apparatus 210 automates all of the aforementioned operations.

Referring to FIG. 4, the first apparatus 210 according to an embodiment of the present disclosure includes a fixing member gripper 410*a*, a lens gripper 410*b*, a gripper moving stage 420, a gripper rotation stage 430, a dispenser 440, a hardening part 450, photographing parts 460 and 465, a hardening part moving stage 470, a dispenser moving stage 480, an inspection part (not illustrated), a controller (not illustrated), and memory (not illustrated). The controller may include one or more processors, an integrated circuit, a microchip, a computer, or any other computing device.

The fixing member gripper 410*a* and the lens gripper 410*b* fix the dual fiber fixing member 130 and the first lens 140 to be fixed by the bonding material, respectively.

The gripper moving stage 420 moves or rotates the dual fiber fixing member 130 that has been fixed to the fixing member gripper 410*a* in three axis directions. The gripper moving stage 420 moves the dual fiber fixing member 130 to become close to or distant from the first lens 140 (i.e., in an x axis direction) or moves the dual fiber fixing member 130 on a plane (i.e., a yz plane) that is perpendicular to the direction in which the dual fiber fixing member 130 becomes close to or distant from the first lens 140 so that the dual fiber fixing member 130 is disposed in the same axis as the first lens 140. Furthermore, the gripper moving stage 420 rotates the dual fiber fixing member 130 so that the dual fiber fixing member has a preset angle.

The gripper moving stage 420 includes a first axis moving module 422, a second axis moving module 424, a third axis moving module 426, and a rotation module 428.

The first axis moving module 422 is connected to the second axis moving module 424, and moves the second axis moving module 424 in the first axis under the control of the controller (not illustrated). In this case, the first axis may mean an axis (i.e., the x axis) in which a capillary, and the dual fiber fixing member 130 and the first lens 140 face each other.

The second axis moving module 424 is connected to the third axis moving module 426, and moves the third axis moving module 426 in a second axis under the control of the controller (not illustrated). In this case, the second axis may be one axis that is perpendicular to the first axis.

The third axis moving module 426 is connected to the rotation module 428, and moves the rotation module 428 in a third axis under the control of the controller (not illustrated). In this case, the third axis may be an axis that is perpendicular to both the first axis and the second axis.

The rotation module 428 has one surface connected to the fixing member gripper 410*a* and the other surface connected to the third axis moving module 426, and moves the fixing member gripper 410*a* in the three axes and also directly rotates the fixing member gripper 410*a* under the control of the controller (not illustrated). As the rotation module 428 is connected to the third axis moving module 426 as described above, the rotation module 428 may be moved in the three axes in response to operations of the first to third axis moving modules 422 to 426. Furthermore, the rotation module 428 is implemented to have a rotatable structure, and rotates the fixing member gripper 410*a* connected thereto by electric power received from the outside (not illustrated) (e.g., a motor). As described above, the dual fiber fixing member 130 needs to be disposed at a preset angle and to be bonded to the first lens 140. The rotation module 428 rotates the fixing member gripper 410*a* under the control of the controller (not illustrated) so that the dual fiber fixing member 130 is disposed at the preset angle.

Similar to the rotation module 428 within the gripper moving stage 420, the gripper rotation stage 430 rotates the first lens 140 fixed to the lens gripper 410*b*. The gripper rotation stage 430 rotates the first lens 140 so that the first lens 140 is disposed at a preset angle.

The dispenser 440 injects a bonding material, for example, epoxy into a gap between the dual fiber fixing member 130 and the first lens 140 or into the outskirts of the gap. The dispenser 440 stores the bonding material within a barrel thereof and discharges the bonding material through a tip thereof. The tip of the dispenser 440 is disposed toward the gap between the dual fiber fixing member 130 and the first lens 140, and may inject the bonding material as described above.

The hardening part 450 hardens the bonding material by applying light having a wavelength band in which the injected bonding material is hardened or heat. For example, if the bonding material is implemented as epoxy, the hardening part 450 may be implemented as a light source that radiates light having an ultraviolet ray wavelength band.

The photographing parts 460 and 465 obtain images of portions with which the dual fiber fixing member 130 and the first lens 140 fixed to the fixing member gripper 410*a* and the lens gripper 410*b* come into contact, respectively. Each of the photographing parts 460 and 465 is implemented as equipment capable of obtaining an external image or video, such as a camera, and obtains an image of a portion into which the bonding material has been injected. The photographing parts 460 and 465 are at least two in number, and the at least two photographing parts obtain the image of the portion at different angles. As described above, the dual fiber fixing member 130 and the first lens 140 need to be disposed and bonded at a preset angle. In this case, if the angles of the dual fiber fixing member 130 and the first lens 140 are adjusted based on an image that is captured by one photographing part 460 at one angle, there is a possibility that both the dual fiber fixing member 130 and the first lens 140 may not have the preset angle or the dual fiber fixing member 130 and the first lens 140 may be recognized as if they have the preset angle even in a situation in which the dual fiber fixing member 130 and the first lens 140 have not been disposed in the same axis. Accordingly, the first apparatus 210 includes at least two photographing parts 460 and 465, and photographs corresponding portions at different angles. As exemplified in FIG. 4, the photographing part 460 may photograph a corresponding portion in a vertical upward direction thereof. The photographing part 465 may photograph a corresponding portion at a location that is spaced apart from the dual fiber fixing member 130 and the first lens 140 by a preset distance on an axis (i.e., a y axis) that is perpendicular (except a vertical direction) to the axis (i.e., the x axis) in which the dual fiber fixing member 130 and the first lens 140 become close to or distant from each other. Each of the photographing parts 460 and 465 transmits the captured image to the inspection part (not illustrated) and the controller (not illustrated).

The hardening part moving stage 470 is connected to the hardening part 450, and moves the hardening part 450 in the x axis. The hardening part moving stage 470 moves the hardening part 450 in the x axis, and may become close to or distant from portions with which the dual fiber fixing member 130 and the first lens 140 into which the bonding material has been injected come into contact.

The dispenser moving stage 290 is connected to the dispenser 440, and may move the dispenser 440 in a z axis or in the three axes. The dispenser moving stage 290 may also be connected to the photographing 460 according to part circumstances, and may also move the dispenser 440 and the photographing part 460.

The inspection part (not illustrated) inspects whether the dual fiber fixing member 130 and the first lens 140 have been bonded by the bonding material that has been properly injected into a point at which the dual fiber fixing member 130 and the first lens 140 are bonded, based on images captured by the photographing parts 460 and 465. An inspection process of the inspection part (not illustrated) is exemplified in FIG. 16.

Figure 16:
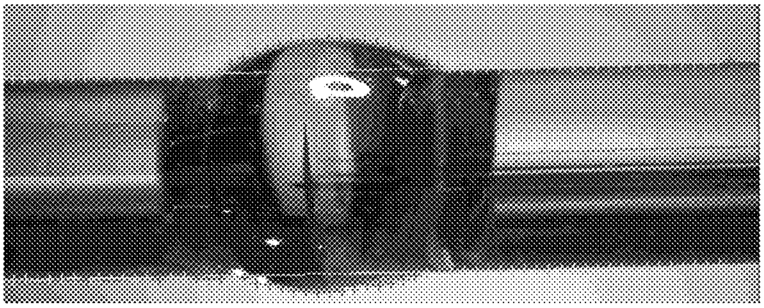
FIG. 16 is a diagram illustrating a process of inspecting, by the automation apparatus for manufacturing and inspecting a reflection port, whether a reflection port has been wholly bonded by using a bonding material according to an embodiment of the present disclosure.

FIG. 16 is a diagram illustrating a process of inspecting, by the automation apparatus for manufacturing and inspecting a reflection port, whether a reflection port has been wholly bonded by using a bonding material according to an embodiment of the present disclosure.

Referring to FIG. 16, the inspection part (not illustrated) receives an image captured by the photographing part 460 or the photographing part 465, basically, by the photographing part 460, and analyzes an edge within the image. As illustrated in FIG. 16, the inspection part (not illustrated) may determine whether the edge within the image is the edge of the dual fiber fixing member 130 and the first lens 140 or the edge of a bonding material that has bonded the dual fiber fixing member 130 and the first lens 140 based on a shape of the edge by analyzing the edge. In general, the edge of the dual fiber fixing member 130 and the first lens 140 has a rectilinear form, whereas the edge of the bonding material has a curved form, such as a circle or an oval. The inspection part (not illustrated) determines whether the length of the top and bottom of the bonding material, which has been photographed in one direction, has a difference having a preset reference value or less by determining the edge of the bonding material. When the length of the top and bottom of the bonding material has the difference having the preset reference value or less, the inspection part (not illustrated) may determine that the bonding material has been uniformly applied and hardened without a problem. In contrast, when the length of the top and bottom of the bonding material has a difference greater than the preset reference value, the inspection part (not illustrated) may determine that the bonding material has not been uniformly applied and hardened. The controller (not illustrated) may rotate the dual fiber fixing member 130 and the first lens 140 for inspection. The photographing part 460 may photograph (e.g., a total of three times) an image of a portion at which the dual fiber fixing member 130 and the first lens 140 are bonded at an interval of a preset angle (e.g., 60°) under the control of the controller (not illustrated). The inspection part (not illustrated) inspects whether the bonding material has been uniformly applied by determining whether the length of the top and bottom of the bonding material has a difference having a preset reference value or less within each of all of captured images.

Referring back to FIG. 4, the controller (not illustrated) controls an operation of each component within the first apparatus 210.

When the dual fiber fixing member 130 and the first lens 140 are mounted on the fixing member gripper 410*a* and the lens gripper 410*b*, respectively, the controller (not illustrated) controls the fixing member gripper 410*a* so that the dual fiber fixing member 130 is moved toward the first lens 140. Thereafter, the controller (not illustrated) aligns the dual fiber fixing member 130 and the first lens 140 on the same axis based on images captured by the photographing parts 460 and 465, and controls the dual fiber fixing member 130 and the first lens 140 to be disposed and bonded at a preset angle. The controller (not illustrated) controls the dual fiber fixing member 130 and the first lens 140 to be disposed and bonded at a preset angle while the dual fiber fixing member 130 and the first lens 140 undergo processes illustrated in FIGS. 5 and 6.

Figure 5A:
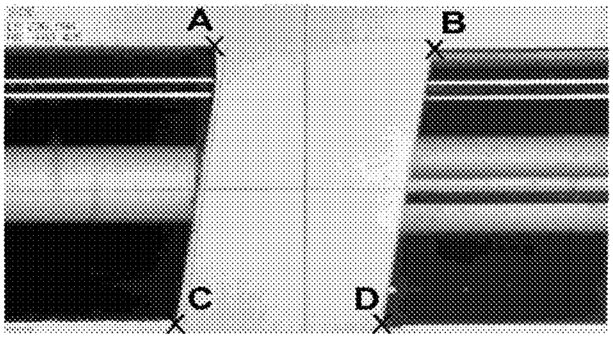
FIGS. 5A and 5B are diagrams illustrating parts of reflection ports that were photographed by the automation apparatus for manufacturing and inspecting a reflection port according to an embodiment of the present disclosure.
Figure 5B:
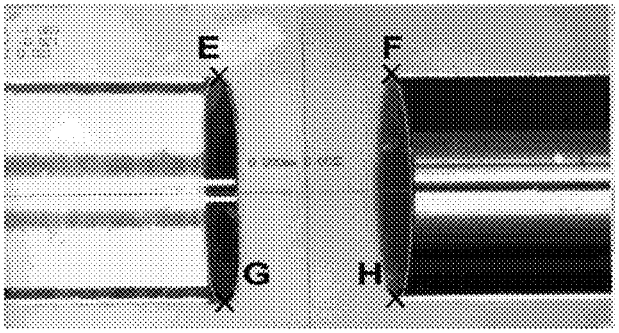
Figure 6A:
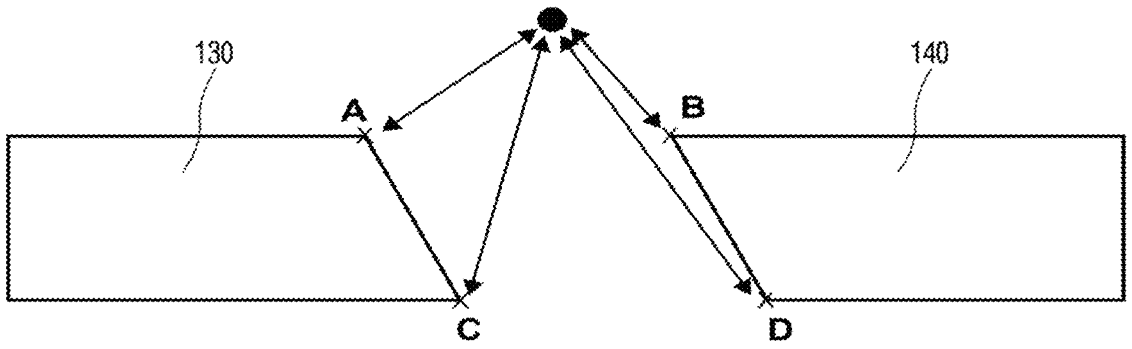
FIGS. 6A and 6B are diagrams that exemplify a process of calculating, by the automation apparatus for manufacturing and inspecting a reflection port, the angle of each of a dual fiber fixing member and a first lens according to an embodiment of the present disclosure.
Figure 6B:
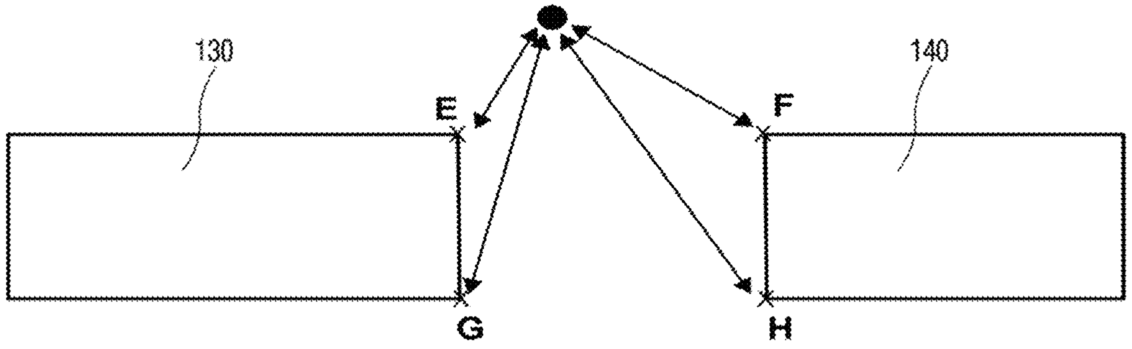

FIGS. 5A and 5B are diagrams s illustrating parts of reflection ports that were photographed by the automation apparatus for manufacturing and inspecting a reflection port according to an embodiment of the present disclosure. FIGS. 6A and 6B are diagrams that exemplify a process of calculating, by the automation apparatus for manufacturing and inspecting a reflection port, the angle of each of a dual fiber fixing member and a first lens according to an embodiment of the present disclosure.

As illustrated in FIGS. 5A and 5B, the controller (not illustrated) receives images captured by the photographing parts 460 and 465, and extracts corners A, C, E, G, and B, D, F, H of ends of the dual fiber fixing member 130 and the first lens 140, which face each other, from the images. After setting a preset reference point within the image, the controller (not illustrated) calculates a distance (by using coordinates) between each of the corners and the preset reference point. In this case, the preset reference point corresponds to a virtual point that has been set for calculation and that is disposed within the image.

The controller (not illustrated) determines whether the dual fiber fixing member 130 and the first lens 140 have been aligned on the axis (i.e., the x axis) in which the dual fiber fixing member 130 and the first lens 140 face each other, based on the images captured by the photographing parts 460 and 465 and the locations of the extracted corners. Furthermore, the controller (not illustrated) analyzes how many degrees of angle the dual fiber fixing member 130 is now disposed or how many degrees the dual fiber fixing member 130 has been twisted on the basis of a preset angle, based on information on the distance between each of the corners A, C, E, and G within the dual fiber fixing member 130 and the preset reference point. Likewise, the controller (not illustrated) analyzes how many degrees of angle the first lens 140 is now disposed or how many degrees the first lens 140 has been twisted on the basis of a preset angle, based on information on the distance between each of the corners B, D, F, and H within the first lens 140 and the preset reference point. The memory (not illustrated) matches and stores how many degrees of angles the dual fiber fixing member 130 and the first lens 140 have been disposed or how many degrees the dual fiber fixing member 130 and the first lens 140 have been twisted on the basis of the preset angle, based on the distance between each of the corners and the preset reference point. The memory (not illustrated) matches and stores the aforementioned information with respect to all angles. The controller (not illustrated) analyzes how much difference occurs from the preset angle by analyzing how many degrees of angle each of the dual fiber fixing member 130 and the first lens 140 has, based on the information stored in the memory (not illustrated) and the analyzed angle information. The controller (not illustrated) rotates the dual fiber fixing member 130 and the first lens 140 so that the dual fiber fixing member 130 and the first lens 140 are disposed at the preset angle by controlling the gripper moving stage 420 and the gripper rotation stage 430 based on the analyzed results. Accordingly, the dual fiber fixing member 130 and the first lens 140 may have an environment in which the dual fiber fixing member 130 and the first lens 140 are disposed at the preset angle and may be bonded.

Referring back to FIG. 4, after adjusting the angles of the dual fiber fixing member 130 and the first lens 140, the controller (not illustrated) controls the dispenser 440, the hardening part 450, the hardening part moving stage 470, and the dispenser moving stage 480 to be bonded by a bonding material, so that the reflection port is manufactured. The controller (not illustrated) may perform bonding and hardening through processes illustrated in FIGS. 7 to 10, or may perform bonding and hardening through processes illustrated in FIGS. 11 to 15.

FIGS. 7 to 10 are diagrams illustrating a process of aligning and fixing, by the automation apparatus for manufacturing and inspecting a reflection port, the dual fiber fixing member and the first lens according to a first embodiment of the present disclosure.

Figure 7:
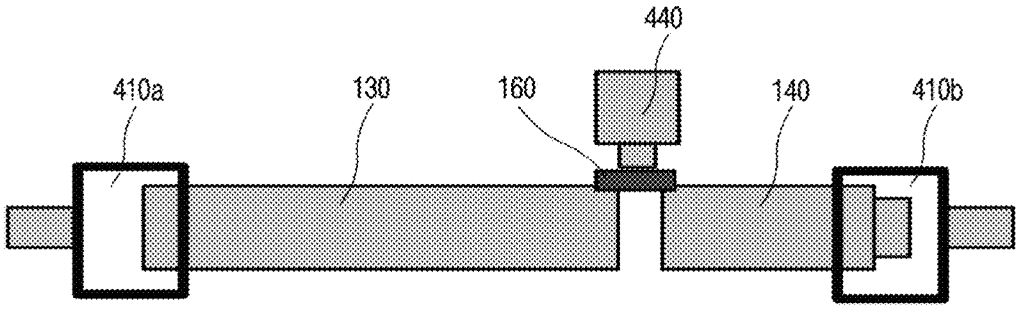
FIGS. 7 to 10 are diagrams illustrating a process of aligning and fixing, by the automation apparatus for manufacturing and inspecting a reflection port, the dual fiber fixing member and the first lens according to a first embodiment of the present disclosure.

As illustrated in FIG. 7, after the angles of the dual fiber fixing member 130 and the first lens 140 are adjusted under the control of the controller (not illustrated), the dual fiber fixing member 130 and the first lens 140 are closely disposed by the fixing member gripper 410*a* and the lens gripper 410*b* so that the dual fiber fixing member 130 and the first lens 140 are bonded. Thereafter, the dispenser 440 approaches a bonding portion of the dual fiber fixing member 130 and the first lens 140, and injects the bonding material 160 into one location thereof under the control of the controller (not illustrated). The dispenser 440 injects the bonding material 160 into the outskirts of the bonding portion of the dual fiber fixing member 130 and the first lens 140.

Figure 8:
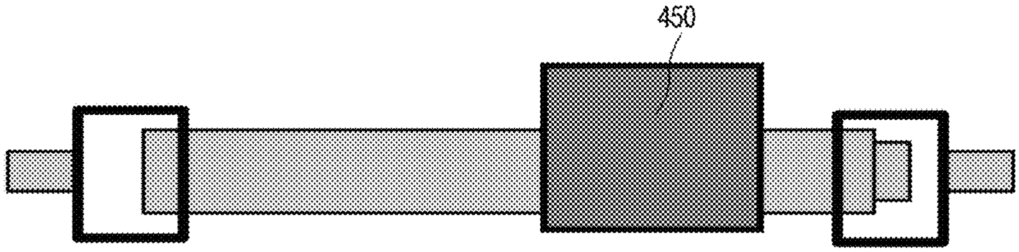

As illustrated in FIG. 8, the hardening part 450 moves to the location into which the bonding material 160 has been injected and hardens the injected bonding material under the control of the controller (not illustrated).

Figure 9:
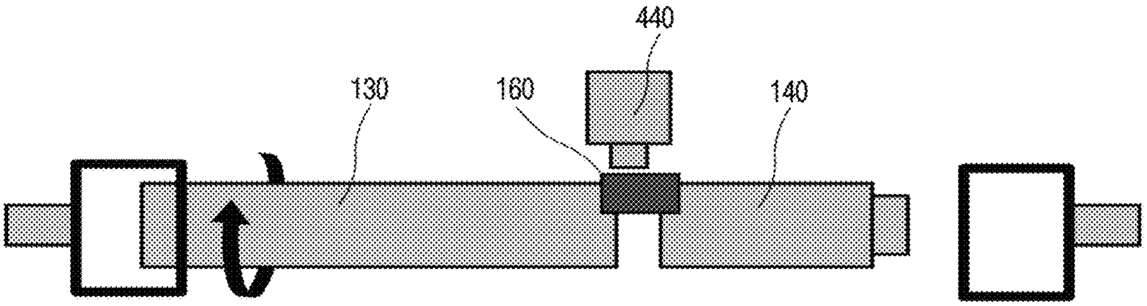

As illustrated in FIG. 9, the controller (not illustrated) rotates the dual fiber fixing member 130 or the dual fiber fixing member 130 and the first lens 140 by controlling the fixing member gripper 410*a* and/or the lens gripper 410*b*, and controls the dispenser 440 so that the bonding material 160 is applied to the outskirts of the bonding portion of the dual fiber fixing member 130 and the first lens 140. Furthermore, the controller (not illustrated) controls the hardening part 450 so that the applied bonding material 160 is hardened. That is, the controller (not illustrated) repeats the control process illustrated in FIG. 7 and the control process illustrated in FIG. 8, and bonds the outskirts of the bonding portion of the dual fiber fixing member 130 and the first lens 140 by the bonding material 160.

Figure 10:
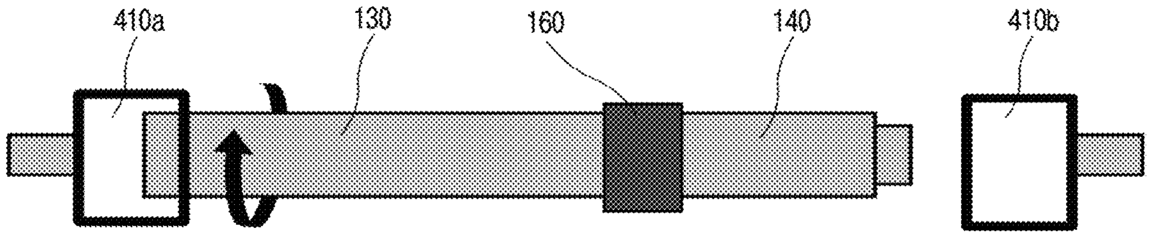

Accordingly, as illustrated in FIG. 10, the dual fiber fixing member 130 and the first lens 140 are bonded in the state in which the dual fiber fixing member 130 and the first lens 140 have a preset angle, and are manufactured as the reflection port. The controller (not illustrated) controls the inspection part (not illustrated) to inspect whether the bonding material has been uniformly applied as described above.

The controller (not illustrated) may perform the bonding and the hardening as illustrated in FIGS. 11 to 15.

FIGS. 11 to 15 are diagrams illustrating a process of aligning and fixing, by the automation apparatus for manufacturing and inspecting a reflection port, the dual fiber fixing member and the first lens according to a second embodiment of the present disclosure.

Figure 11:
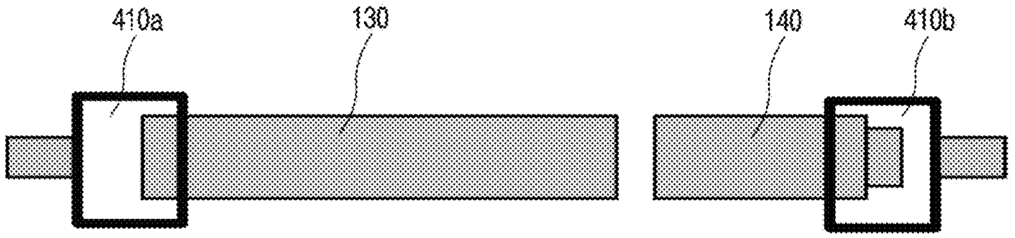
FIGS. 11 to 15 are diagrams illustrating a process of aligning and fixing, by the automation apparatus for manufacturing and inspecting a reflection port, the dual fiber fixing member and the first lens according to a second embodiment of the present disclosure.

As illustrated in FIG. 11, the controller (not illustrated) adjusts the angles of the dual fiber fixing member 130 and the first lens 140, and controls the fixing member gripper 410*a* and/or the lens gripper 410*b* so that the dual fiber fixing member 130 and the first lens 140 are closely aligned at a preset interval.

Figure 12:
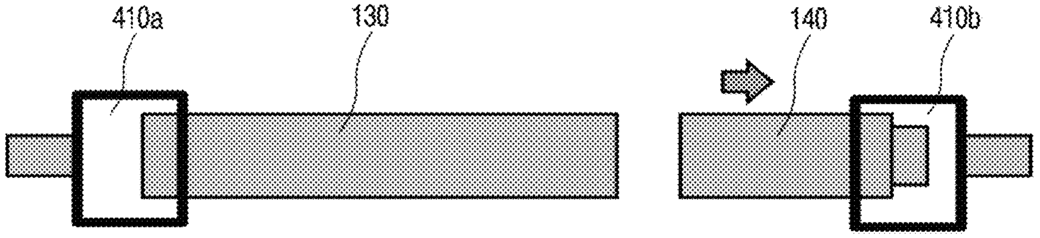

As illustrated in FIG. 12, the controller (not illustrated) controls the fixing member gripper 410*a* and/or the lens gripper 410*b* so that an interval between the dual fiber fixing member 130 and the first lens 140 is increased.

Figure 13:
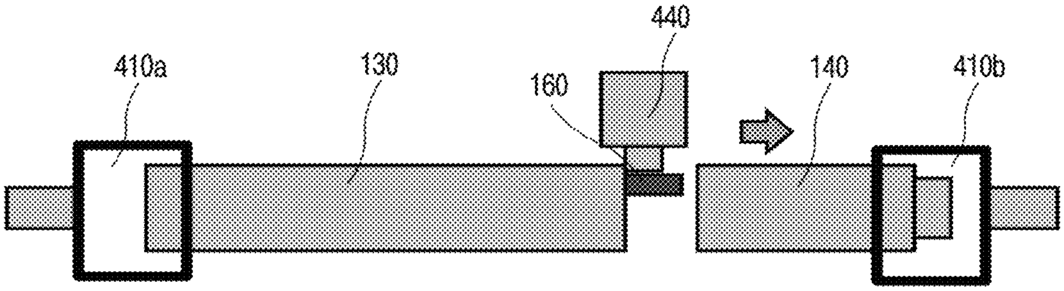
Figure 14:
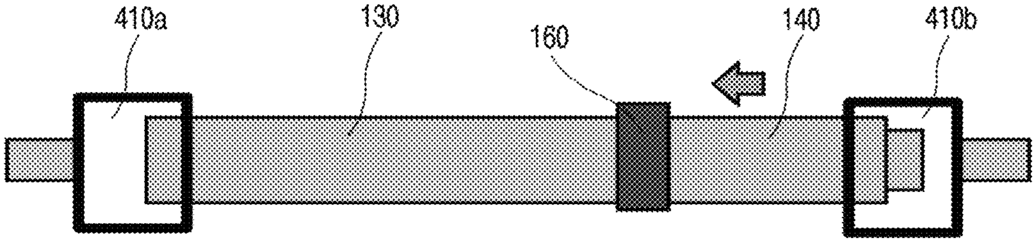

As illustrated in FIGS. 13 and 14, the controller (not illustrated) controls the dispenser moving stage 480 so that the dispenser 440, more specifically, the tip of the dispenser 440 is disposed in the interval between the dual fiber fixing member 130 and the first lens 140. Thereafter, the controller (not illustrated) controls the dispenser 440 to inject the bonding material, and simultaneously or thereafter controls the fixing member gripper 410*a* and/or the lens gripper 410*b* so that the dual fiber fixing member 130 and the first lens 140 become close to each other. The controller (not illustrated) controls the dispenser 440 to inject the bonding material into all of portions within the interval between the dual fiber f fixing member 130 and the first lens 140.

Figure 15:
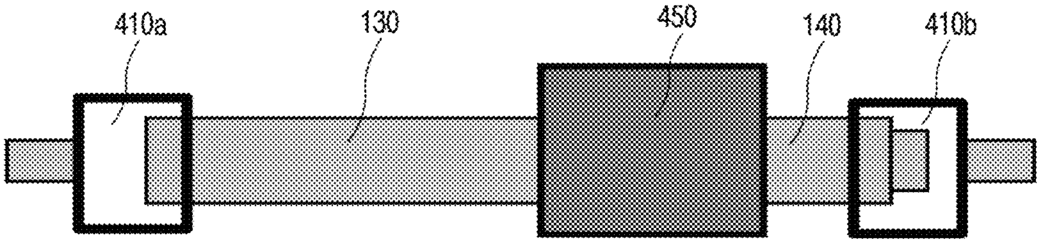

As illustrated in FIG. 15, the controller (not illustrated) moves the hardening part 450 to the location into which the bonding material 160 has been injected, and controls the hardening part 450 to harden the injected bonding material.

Accordingly, the reflection port in which the bonding material has been injected into the interval between the dual fiber fixing member 130 and the first lens 140 and then bonded may be manufactured.

Referring back to FIG. 4, the memory (not illustrated) matches and stores the distance between each of the corners A to H and the preset reference point for each angle of the dual fiber fixing member 130 and the first lens 140. That is, the memory (not illustrated) matches and stores a distance between each of the corners of the dual fiber fixing member 130 and the first lens 140 and the preset reference point whenever the dual fiber fixing member 130 and the first lens 140 are disposed at a specific angle or are twisted at a specific angle on the basis of a preset angle. Accordingly, the memory (not illustrated) enables the controller (not illustrated) to rotate the dual fiber fixing member 130 and the first lens 140 so that the dual fiber fixing member 130 and the first lens 140 are disposed at the preset angle as described above.

Figure 17:
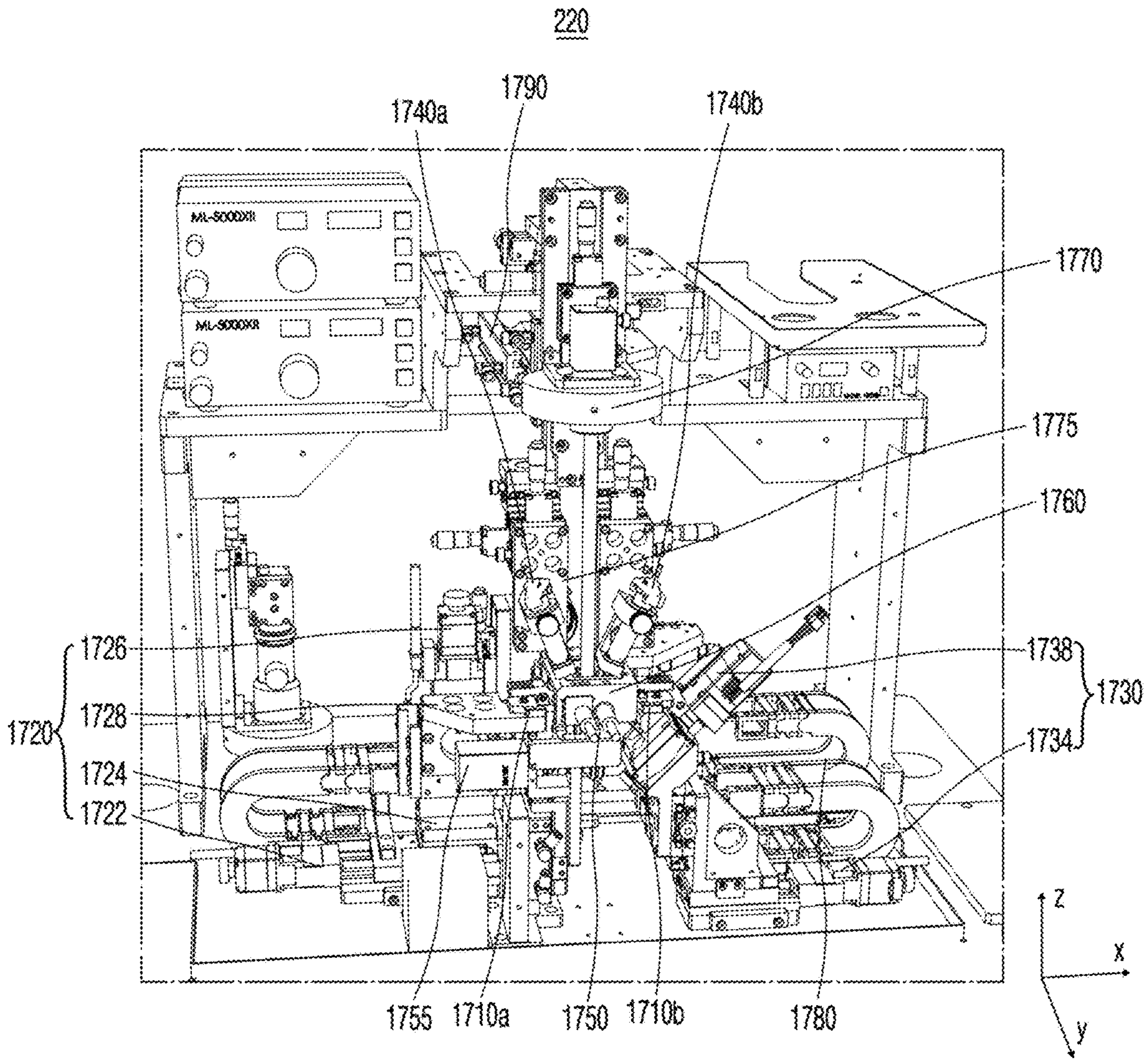
FIG. 17 is a diagram illustrating a construction of an automation apparatus for manufacturing and inspecting a WDM element according to an embodiment of the present disclosure.

FIG. 17 is a diagram illustrating a construction of an automation apparatus for manufacturing and inspecting a WDM element according to an embodiment of the present disclosure.

Referring to FIG. 17, a second apparatus 220 according to an embodiment of the present disclosure includes capillary grippers 1710*a* and 1710*b*, gripper moving stages 1720 and 1730, dispensers 1740*a* and 1740*b*, a rotation belt 1750, a motor 1755, a hardening part 1760, photographing parts 1770 and 1775, a hardening part moving stage 1780, a dispenser moving stage 1790, an inspection part (not illustrated), a controller (not illustrated) and memory (not illustrated). Moreover, the second apparatus 220 may further include a pre-processor (not illustrated).

The capillary grippers 1710*a* and 1710*b* fix the first and second capillaries 110 and 115 to be fixed to the glass tube 190 by a bonding material. The capillary gripper 1710*a* fixes the first capillary 110, and the capillary gripper 1710*b* fixes the second capillary 115.

The gripper moving stage 1720 moves the first capillary 110 fixed to the capillary gripper 1710*a* into the glass tube 190 or moves the first capillary 110 fixed to the capillary gripper 1710*a* so that the first capillary 110 becomes distant from the glass tube 190. The gripper moving stage 1720 moves the capillary gripper 1710*a* in the three axis directions, and moves the location of the first capillary 110 fixed to the capillary gripper 1710*a*. The gripper moving stage 1720 moves the first capillary 110 into the glass tube 190.

Furthermore, in a process of a bonding material being applied to gaps between the first and second capillaries 110 and 115 and the glass tube 190, the gripper moving stage 1720 moves the capillary gripper 1710*a* so that the first capillary 110 becomes distant from or close to the glass tube 190.

The gripper moving stage 1720 includes a first axis moving module 1722, a second axis moving module 1724, a third axis moving module 1726, and a bracket 1728.

The first axis moving module 1722 is connected to the second axis moving module 1724, and moves the second axis moving module 1724 in a first axis under the control of the controller (not illustrated). In this case, the first axis may mean an axis (i.e., an x axis) in which the first and second capillaries 110 and 115 face each other.

The second axis moving module 1724 is connected to the third axis moving module 1726, and moves the third axis moving module 1726 in a second axis under the control of the controller (not illustrated). In this case, the second axis may be an axis that is perpendicular to the first axis.

The third axis moving module 1726 is connected to the bracket 1728, and moves the bracket 1728 in a third axis under the control of the controller (not illustrated). In this case, the third axis may be an axis that is perpendicular to both the first axis and the second axis.

The bracket 1728 has one surface connected to the capillary gripper 1710*a* and the other surface connected to the third axis moving module 1726, and moves the capillary gripper 1710*a* in the three axes. As the bracket 1728 is connected as described above, the bracket 1728 may be moved in the three axes in response to movements of the first to third axis moving modules 1722 to 1726.

Similar to the gripper moving stage 1720, the gripper moving stage 1730 moves the second capillary 115 fixed to the capillary gripper 1710*b* into the glass tube 190 or moves the second capillary 115 so that the second capillary 115 becomes distant from the glass tube 190. However, unlike the gripper moving stage 1720, the gripper moving stage 1730 may adjust the tilting angle of the second capillary 115 fixed to the capillary gripper 1710*b*.

The gripper moving stage 1730 includes a first axis moving module 1734 and a tilting adjustment module 1738.

The first axis moving module 1734 is connected to the tilting adjustment module 1738, and moves the tilting adjustment module 1738 in the first axis under the control of the controller (not illustrated).

The tilting adjustment module 1738 has one surface connected to the capillary gripper 1710*b* and the other surface connected to the first axis moving module 1734, and adjusts the location of the capillary gripper 1710*b* in the first axis or the tilting angle of the capillary gripper 1710*b*. Unlike the first axis moving module 1734, the tilting adjustment module 1738 is not disposed in a direction parallel to the first axis, and is disposed at a predetermined angle to the first axis. Accordingly, if the tilting adjustment module 1738 itself moves, the tilting adjustment module 1738 may move the capillary gripper 1710*b* in the first axis and also move the capillary gripper 1710*b* in a z axis (i.e., a height or a vertical direction thereof). Accordingly, the tilting adjustment module 1738 may simultaneously adjust the capillary gripper 1710*b* in the first axis and the z axis.

The gripper moving stage 1730 may move the capillary gripper 1710*b* only in the first axis, may move the capillary gripper 1710*b* both in the first axis and the z axis, and may adjust the tilting angle of the capillary gripper 1710*b* because the gripper moving stage 1730 includes the first axis moving module 1734 and the tilting adjustment module 1738.

Each of the dispensers 1740*a* and 1740*b* injects the bonding material 168 into each of a gap between the first capillary 110 and the glass tube 190 and a gap between the second capillary 115 and the glass tube 190, which have been fixed to the grippers 1710*a* and 1710*b*. Each of the dispensers 1740*a* and 1740*b* stores the bonding material in a barrel thereof, and discharges the bonding material through a tip thereof.

The tips of the dispensers 1740*a* and 1740*b* are disposed toward the gaps, when the first and second capillaries 110 and 115 and the glass tube 190 are fixed to the grippers 1710*a* and 1710*b*. Accordingly, the dispensers 1740*a* and 1740*b*, more specifically, the tips of the dispensers 1740*a* and 1740*b* are disposed to be spaced apart from each other at least by the length of the glass tube 190 (in the first axis). Accordingly, the dispensers 1740*a* and 1740*b* may inject the bonding material into the gap between the first capillary 110 and the glass tube 190 and the gap between the second capillary 115 and the glass tube 190, respectively, which have been fixed to the grippers 1710*a* and 1710*b*.

The rotation belt 1750 comes into contact with the glass tube 190 through a part thereof, and rotates the glass tube 190. The rotation belt 1750 has a structure in which a part of the rotation belt 1750 comes into contact with the glass tube 190, and is supplied with electric power from the motor 1755. Accordingly, the rotation belt 1750 transmits a rotational force to the glass tube 190 with which the rotation belt 1750 comes into contact while rotating. The glass tube 190 to which the rotational force is transmitted is rotated.

The motor 1755 provides the rotation belt 1750 with electric power by which the rotation belt 1750 may be rotated.

The hardening part 1760 hardens the bonding material 168 by applying light or heat. For example, if the bonding material is implemented as epoxy, the hardening part 1760 may be implemented as a light source that radiates light having an ultraviolet ray wavelength band in order to harden the bonding material.

The photographing parts 1770 and 1775 obtain images of portions of the first and second capillaries 110 and 115 and the glass tube 190 into which the bonding material has been injected, in different directions of the tips of the dispensers 1740*a* and 1740*b*. Like the photographing parts 460 and 465, at least two photographing parts 1770 and 1775 are included, and obtain the images of the aforementioned portions at different angles. As exemplified in FIG. 17, the photographing part 1770 may photograph a corresponding portion in a vertical upward location thereof. The photographing part 1775 may capture images at locations that are spaced apart from the first capillary 110 and the second capillary 115 by a preset distance in an axis (i.e., a y axis) that is perpendicular (except the vertical direction) to the axis (i.e., the x axis) in which the first capillary 110 and the second capillary 115 become close to each other or distant from each other. The photographing parts 1770 and 1775 transmits the captured images to the inspection part (not illustrated) and the controller (not illustrated).

The hardening part moving stage 1780 is connected to the hardening part 1760, and moves the hardening part 1760 in the x axis. The hardening part moving stage 1780 moves the hardening part 1760 in the x axis, and may make the hardening part 1760 become close to or distant from the portion into which the bonding material has been injected.

The dispenser moving stage 1790 is connected to the dispensers 1740*a* and 1740*b*, and may move the dispensers 1740*a* and 1740*b* in the z axis or in the three axes. The dispenser moving stage 1790 may also be connected to the photographing part 1770 according to circumstances, and may move both the dispensers 1740*a* and 1740*b* and the photographing part 1770.

The inspection part (not illustrated) inspects whether an adequate amount of the bonding material has been injected, whether the bonding material has been uniformly applied, and whether an air bubble has occurred in the bonding material, based on the images captured by the photographing parts 1770 and 1775. An inspection process of the inspection part (not illustrated) has been exemplified in FIGS. 26 to 28.

FIGS. 26A to 28 are diagrams illustrating a process of inspecting, by the automation apparatus for manufacturing and inspecting a WDM element, whether a bonding material has been uniformly applied to a WDM element according to an embodiment of the present disclosure.

Figure 26A:
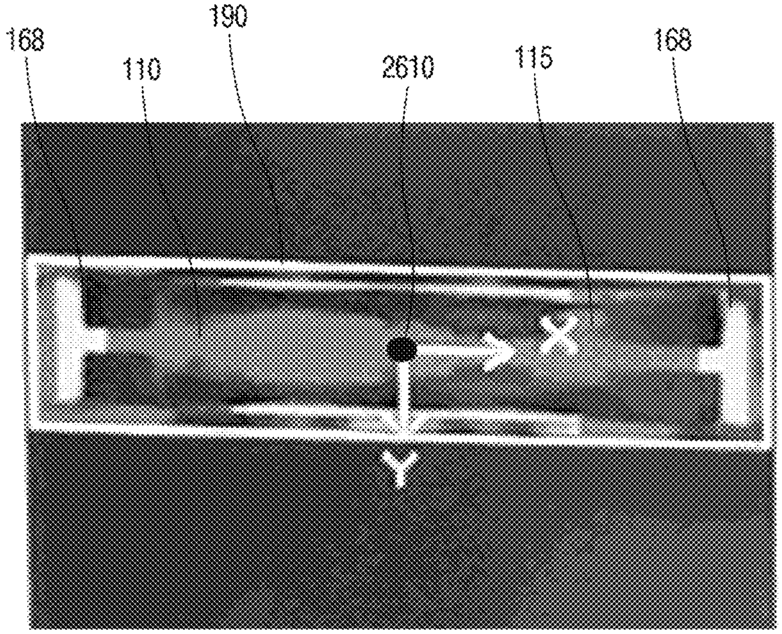
FIGS. 26A, 26B, 27, and 28 are diagrams illustrating a process of inspecting, by the automation apparatus manufacturing and inspecting a WDM element, whether a bonding material has been uniformly applied to a WDM element according to an embodiment of the present disclosure.
Figure 27:
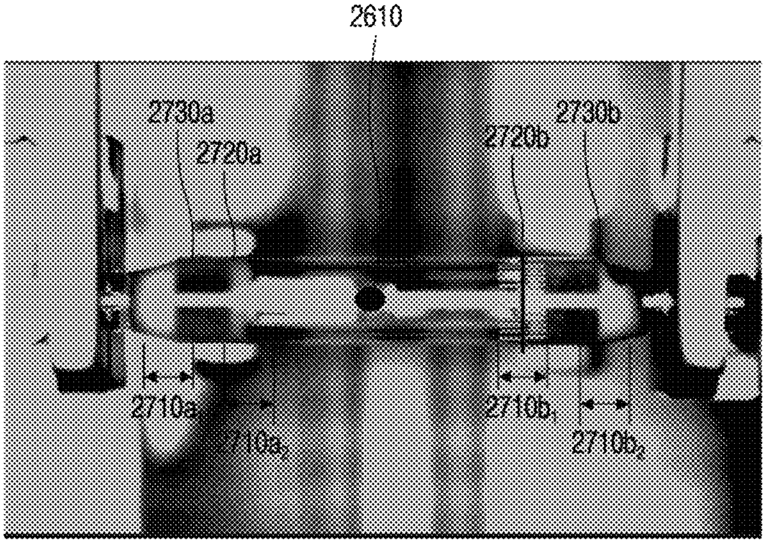
Figure 28:
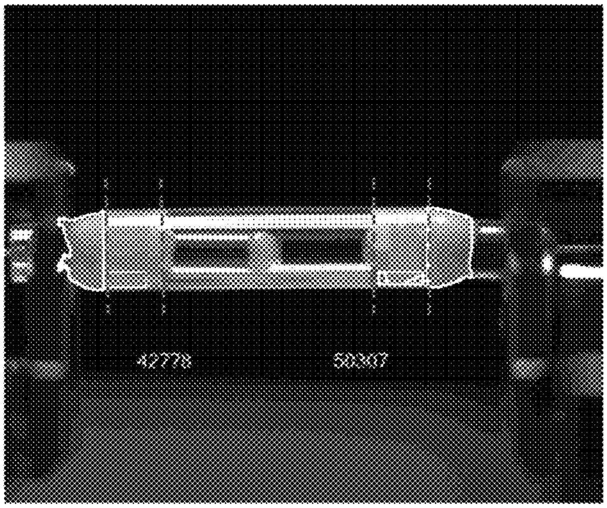

As illustrated in FIG. 26A, the memory (not illustrated) stores a standard image of a common WDM element, which was captured by the photographing part and in which abnormality did not occur when the bonding material was applied. Furthermore, the memory (not illustrated) also stores a central point 2610 of the WDM element within the standard image of the WDM element and the locations or coordinates of the bonding material injected into the glass tube 190 when the abnormality did not occur. The location of the bonding material stored in the memory (not illustrated) includes the locations or coordinates of the bonding material at which the bonding material is close to the central point 2610 and the locations or coordinates of the bonding material at which the bonding material is distant from the central point 2610. In this case, the memory (not illustrated) may store the locations or coordinates of each bonding material on the basis of the central point 2610, and may store the locations or coordinates of each bonding material as a range. Referring to FIG. 27, the memory (not illustrated) may store the locations (corresponding to locations 2720*a*, 2720*b*, 2730*a*, and 2730*b* in FIG. 27) of each bonding material on the basis of the central point, and may store each of the locations or coordinates as a range (corresponding to 2710 in FIG. 27).

Figure 26B:
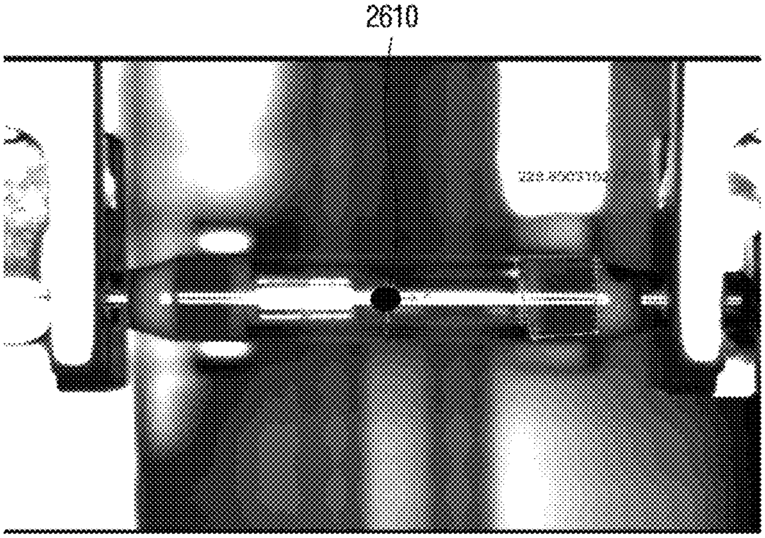

The inspection part (not illustrated) receives an image of a WDM element to be inspected, which has been captured by the photographing part 1770 or the photographing part 1775, more preferably, the photographing part 1770. The inspection part (not illustrated) may directly receive the image captured by the photographing part 1770, and may receive a black and white image that has undergone through the pre-processor (not illustrated) to be described later. As illustrated in FIG. 26B, the inspection part (not illustrated) detects the central point 2610 within the received images by comparing the received images with the standard image stored in the memory (not illustrated). In general, WDM elements have almost the same standard. Accordingly, the inspection part (not illustrated) may simply detect the central point 2610 within two received images by comparing the two images.

Thereafter, the inspection part (not illustrated) detects the locations or coordinates of each bonding material based on information stored in the memory (not illustrated), on the basis of the central point 2610. The inspection part (not illustrated) may detect the locations or coordinates of each bonding material by using a method of detecting an edge within a received image. However, for more rapid and accurate detection, the inspection part (not illustrated) may detect the edges 2720*a*, 2720*b*, 2730*a*, and 2730*b* in a corresponding range based on range information 2710*a*1, 2710*a*2, 2710*b*1, and 2710*b*2 of the locations of each bonding material, which have been stored in the memory (not illustrated). The inspection part (not illustrated) may calculate the area or volume of the bonding material that has been injected into the glass tube 190, based on the detected edges 2720*a*, 2720*b*, 2730*a*, and 2730*b*.

Furthermore, the inspection part (not illustrated) detects the area or volume of a bonding material that has been hardened outside the glass tube 190, within an image received from the photographing part 1770 or the pre-processor (not illustrated). The inspection part (not illustrated) detects the area or volume of the bonding material that has been disposed in the outskirts of the edges 2730*a* and 2730*b* detected in the aforementioned image. The inspection part (not illustrated) may inspect whether an adequate amount of the bonding material has been injected into the glass tube 190 and whether the bonding material has been uniformly applied, based on the detected area or volume.

The inspection part (not illustrated) also inspects whether an air bubble has occurred in the bonding material, based on the image received from the photographing part 1770 and/or the photographing part 1775. If an air bubble occurs in the bonding material, there is a problem in that the quality of a WDM element is deteriorated. Accordingly, the inspection part (not illustrated) also inspects whether an air bubble has occurred in the bonding material. The inspection part (not illustrated) determines whether a color different from a surrounding color is present by analyzing a color in a detected region of the bonding material. An air bubble within a bonding material is transparent, or has a color different from a hardened bonding material by reflecting light from the outside. Accordingly, the inspection part (not illustrated) detects whether an air bubble has occurred in a bonding material by inspecting whether a region in which a color is different from a surrounding color is present in a detected region of the bonding material. The controller (not illustrated) may rotate an inspection region by controlling the motor 1755 in the process of inspecting, by the inspection part (not illustrated), whether an air bubble has occurred. The inspection part (not illustrated) may inspect whether an air bubble has occurred in all portions of a bonding material.

Referring back to FIG. 17, the controller (not illustrated) controls an operation of each component within the second apparatus 220.

If the first and second capillaries 110 and 115 are mounted on the capillary grippers 1710*a* and 1710*b*, respectively, the controller (not illustrated) controls the gripper moving stages 1720 and 1730 so that the first and second capillaries 110 and 115 move toward the glass tube 190, more specifically, into the glass tube 190. The controller (not illustrated) may perform the aforementioned control based on corresponding images because the photographing parts 1770 and 1775 obtain the images in one direction of the tips of the dispensers 1740*a* and 1740*b*.

When the first and second capillaries 110 and 115 move into the glass tube 190, the controller (not illustrated) controls the dispenser moving stage 1790 and the dispenser 1740 so that the dispenser 1740 injects the bonding material into the gaps between the first and second capillaries 110 and 115 and the glass tube 190. In this case, the controller (not illustrated) does not simply control the dispenser 1740 so that the dispenser 1740 injects the bonding material, but controls the gripper moving stages 1720 and 1730 and the motor 1755 simultaneously or sequentially as will be described later with reference to FIGS. 18 to 25. Accordingly, the controller (not illustrated) may control a quantitative amount of the bonding material to be uniformly applied to only a portion to which the bonding material needs to be applied. When the bonding material is fully injected, the controller (not illustrated) hardens the bonding material by controlling the dispenser 1740 to become distant from the injection portion and the hardening part 1760 to become close to a corresponding gap.

The process of the controller (not illustrated) uniformly applying the bonding material to narrow gaps between the first and second capillaries 110 and 115 and the glass tube 190 is illustrated in FIGS. 18 to 25.

Figure 18:
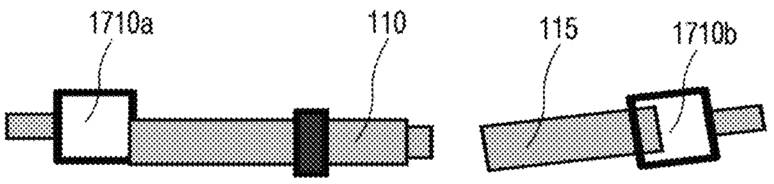
FIGS. 18 to 25 are diagrams illustrating a process of aligning and fixing, by the automation apparatus for manufacturing and inspecting a WDM element, a reflection port, and a pass port according to an embodiment of the present disclosure.

Referring to FIG. 18, the controller (not illustrated) detects the angle of the second capillary 115 at which light that has passed through the first capillary 110 may be incident with a maximum size before moving the first and second capillaries 110 and 115 into the glass tube 190. The controller (not illustrated) detects the angle of the second capillary 115 at which the light that has passed through the first capillary 110 is incident with a maximum size by controlling each of the grippers 1710*a* and 1710*b* or the gripper 1710*b*. The controller (not illustrated) stores a corresponding angle of the second capillary 115 in the memory (not illustrated).

Figure 19:
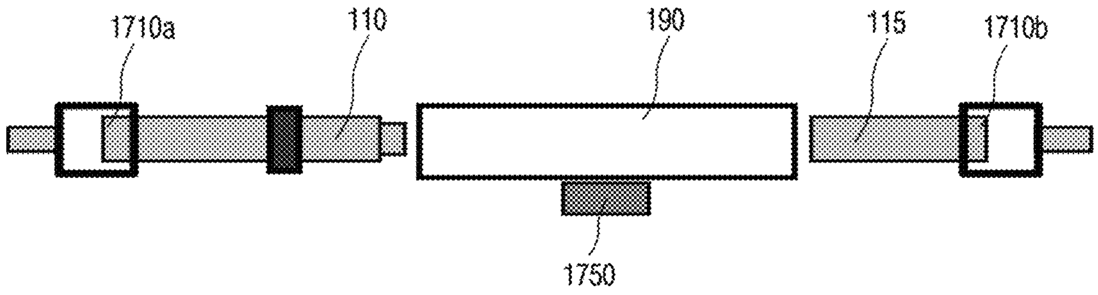

Referring to FIG. 19, the controller (not illustrated) moves each of the first and second capillaries 110 and 115 into the glass tube 190 by controlling each of the grippers 1710*a* and 1710*b*.

Figure 20:
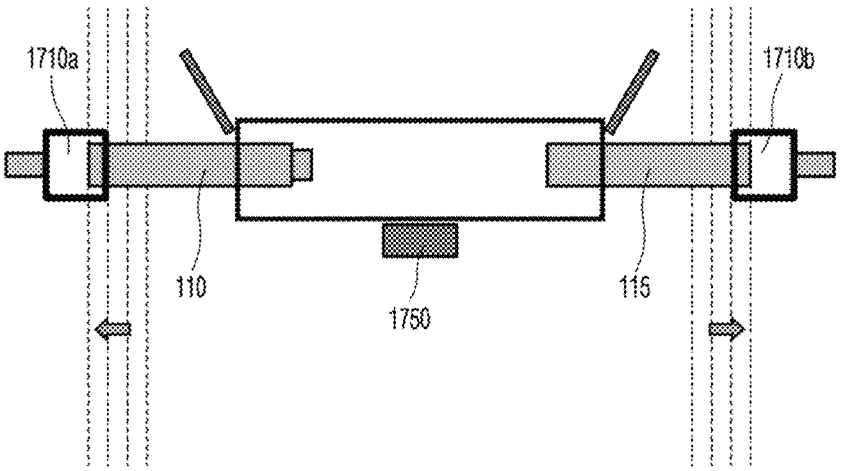

Referring to FIG. 20, the controller (not illustrated) moves the first and second capillaries 110 and 115, which have been introduced into the glass tube 190, up to a first location at which the first and second capillaries 110 and 115 are farthest from each other in the direction of the first axis, by controlling the gripper moving stages 1720 and 1730. Separately, the controller (not illustrated) disposes the dispensers 1740*a* and 1740*b* so that the tips 1745*a* and 1745*b* of the dispensers 1740*a* and 1740*b* are directed toward the gaps formed by the first capillary 110 and the glass tube 190 and the second capillary 115 and the glass tube 190, respectively.

Figure 21:
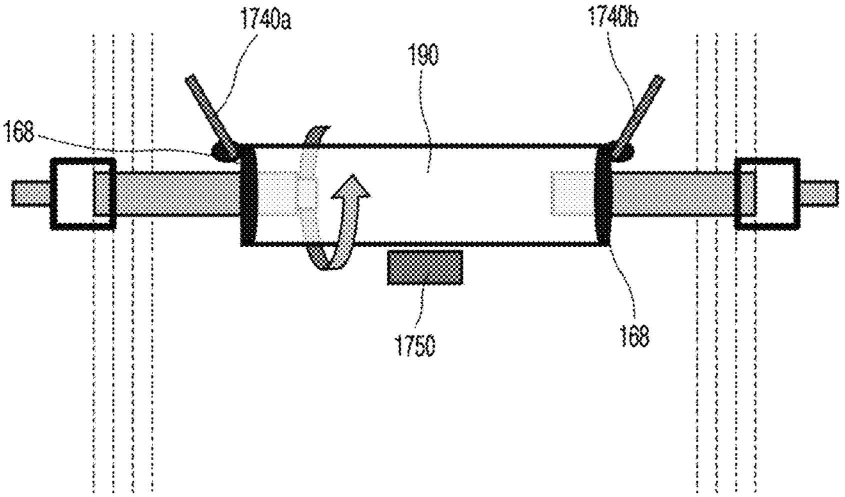

Referring to FIG. 21, when t first and second capillaries 110 and 115 move at the first location, the controller (not illustrated) controls the dispensers 1740*a* and 1740*b* to inject the bonding material into the gaps, and simultaneously controls the motor 1755 to rotate the glass tube 190. The controller (not illustrated) controls the dispensers 1740*a* and 1740*b* so that the bonding material is injected into the inside of the gaps. When the injection of the bonding material is completed up to a preset level, the controller (not illustrated) stops the operations of the dispensers 1740*a* and 1740*b* and the motor 1755 for a preset time so that the bonding material sufficiently infiltrates into the gaps.

Figure 22:
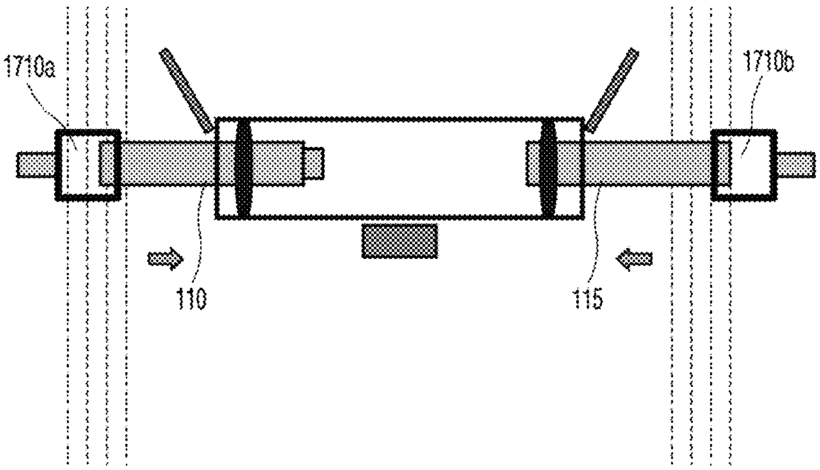

Referring to FIG. 22, after a lapse of a preset time, the controller (not illustrated) moves the first and second capillaries 110 and 115, which have been introduced into the glass tube 190, up to a second location at which the first and second capillaries 110 and 115 become relatively close to each other compared to the first location in the direction of the first axis, by controlling the gripper moving stages 1720 and 1730. In this case, an interval between the first location and the second location may be an interval corresponding to a depth at which the bonding material may be injected and infiltrated when the bonding material is injected into the gap according to the aforementioned process in the state in which each of the first and second capillaries 110 and 115 has been disposed at one location. When the interval between the first location and the second location is greater than the depth, there is a problem in that a portion to which the bonding material is not applied may be present. When the interval between the first location and the second location is smaller than the depth, there may be a problem in that a lot of the bonding material is unnecessarily injected. Accordingly, the interval between the first location and the second location may be set as the aforementioned depth. The bonding material injected when the capillaries 110 and 115 are disposed at the first location is moved into the glass tube 190 by the interval between the first location and the second location.

Figure 23:
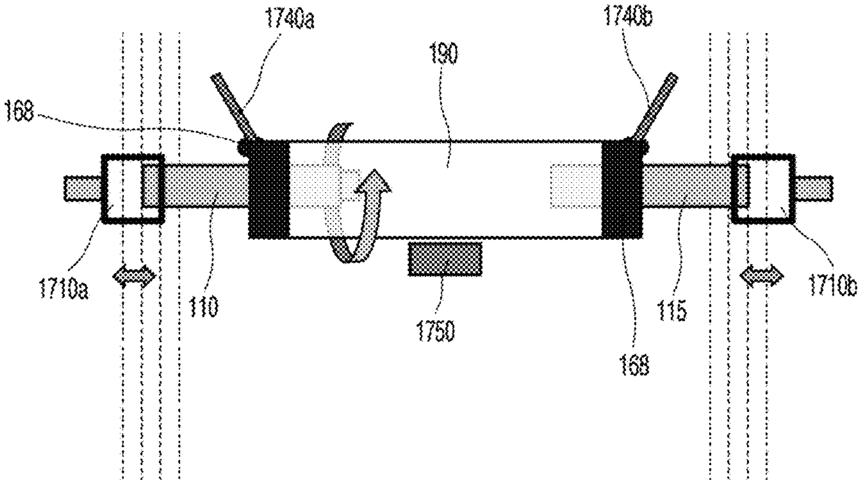

Thereafter, referring to FIG. 23, the bonding material is injected identically with the process described with reference to FIG. 21. That is, the controller (not illustrated) controls the dispensers 1740*a* and 1740*b* so that the bonding material is injected into the gaps, and simultaneously controls the motor 1755 to rotate the glass tube 190.

In this case, the controller (not illustrated) may control the dispensers 1740*a* and 1740*b* and the motor 1755 so that the bonding material is injected into the gaps, and simultaneously may additionally control the gripper moving stages 1720 and 1730 so that the first and second capillaries 110 and 115 reciprocate between the first location and the second location several times. The controller (not illustrated) controls the first and second capillaries 110 and 115 to reciprocate between the first location and the second location in the process of injecting the bonding material so that the bonding material to be applied can be more uniformly applied. Likewise, when the injection of the bonding material is completed, the controller (not illustrated) stops the operations of the dispensers 1740*a* and 1740*b* and the motor 1755 for a preset time so that the bonding material sufficiently infiltrates into the gaps.

The controller (not illustrated) applies the bonding material by a desired depth by repeatedly performing the aforementioned process several times. Accordingly, the bonding material may be in the state in which the bonding material has been uniformly applied in the state in which the first and second capillaries 110 and 115 have been disposed at a location at which the first and second capillaries 110 and 115 need to be disposed within the glass tube 190.

Figure 24:
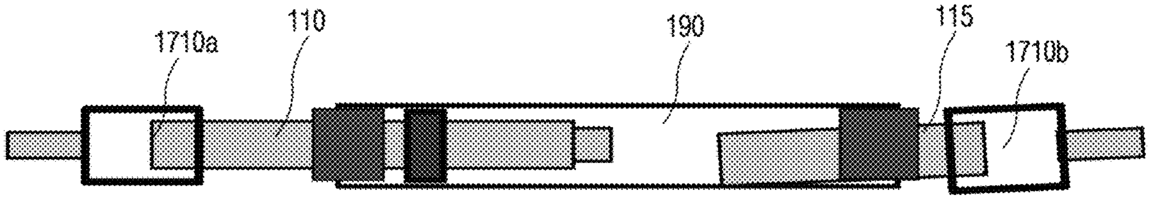

Referring to FIG. 24, the controller (not illustrated) controls the capillary gripper 1710*b* so that the second capillary 115 has an angle that has been stored in the memory (not illustrated) and at which light that has passed through the first capillary 110 can be incident with a maximum size.

At this time, the controller (not illustrated) determines whether an adjusted angle of the second capillary 115 is a preset angle or more. In this case, the preset angle may be a maximum angle at which the capillary may not come into contact with the glass tube 190 when the angle of the capillary is adjusted within the glass tube 190. If the second capillary 115 comes into contact with the glass tube 190, there may be a problem in that the second capillary 115 and/or the glass tube 190 are broken. When the adjusted angle of the second capillary 115 is the preset angle or more, the controller (not illustrated) may determine that a corresponding WDM element has failed, and may not perform a subsequent process.

In contrast, when the adjusted angle of the second capillary 115 is the preset angle or less, the controller (not illustrated) controls the capillary gripper 1710*b* so that the second capillary 115 has a corresponding angle.

Figure 25:
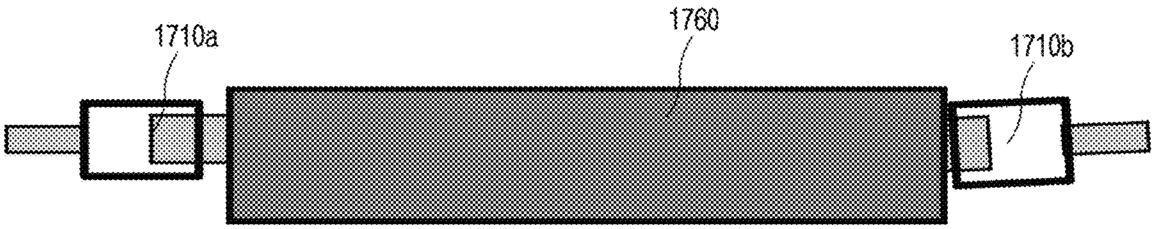

Referring to FIG. 25, the controller (not illustrated) hardens the injected bonding material by controlling the hardening part 1760 and the hardening part moving stage 1780.

Referring back to FIG. 17, the memory (not illustrated) stores a standard image and information on an angle at which light that has passed through the first capillary 110 of the second capillary 115 can be incident with a maximum size.

Moreover, the pre-processor (not illustrated) receives images captured by the photographing parts 1770 and 1775 and converts the images into black images. The pre-processor (not illustrated) transmits the converted black images to the inspection part (not illustrated).

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. An automation apparatus for manufacturing and inspecting a wavelength division multiplexing (WDM) element, the automation apparatus comprising:

a first capillary gripper configured to fix a first capillary to be fixed to a glass tube by a bonding material;

a second capillary gripper configured to fix a second capillary to be fixed to the glass tube by the bonding material;

a first gripper moving stage configured to move the first capillary fixed to the first capillary gripper so that the first capillary moves into the glass tube or the first capillary becomes distant from the glass tube;

a second gripper moving stage configured to move the second capillary fixed to the second capillary gripper so that the second capillary moves into the glass tube or the second capillary becomes distant from the glass tube, the second gripper moving stage including a first-axis moving module configured to move the second capillary in a first-axis direction and a tilting adjustment module disposed at an angle to the first-axis direction, such that movement of the tilting adjustment module moves the second capillary gripper in the first-axis direction and a vertical direction while adjusting a tilting angle of the second capillary;

a dispenser configured to inject the bonding material into a gap that is formed by each capillary and the glass tube;

a rotation belt configured to come into contact with the glass tube through a part thereof and to rotate the glass tube;

a hardening part configured to harden the bonding material;

a photographing part configured to obtain an image of a portion into which the bonding material has been injected;

an inspection part configured to inspect an amount of injection of the bonding material, a state in which the bonding material has been applied, and whether an air bubble has occurred in the bonding material, based on the image captured by the photographing part; and a controller configured to control an operation of each component within the automation apparatus for manufacturing and inspecting a WDM element, wherein the controller determines a preset first angle of the second capillary at which light that has passed through the first capillary is able to be incident with a maximum size, wherein after determining the preset first angle, the controller controls movement of each of the first and second capillaries into the glass tube, wherein the controller controls the dispenser to inject the bonding material into the gap that is formed by each of the first and second capillaries and the glass tube, wherein after the bonding material is applied, the controller controls the second capillary gripper so that the second capillary has the preset first angle, and wherein the controller determines whether the preset first angle for adjusting the second capillary is greater than or equal to a preset second angle that is a maximum angle at which the second capillary does not contact the glass tube after the second capillary is positioned in the glass tube, determines that the WDM element is defective when the preset first angle is greater than or equal to the preset second angle, and controls the second capillary gripper so that the second capillary has the preset first angle and controls the hardening part to harden the injected bonding material when the preset first angle is less than the preset second angle.

2. The automation apparatus of claim 1, further comprising memory configured to store the preset first angle of the second capillary determined by the controller.

* * * * *